United States Patent [19]

Schneid et al.

[11] Patent Number: 4,597,275
[45] Date of Patent: Jul. 1, 1986

[54] CALENDER

[75] Inventors: Josef Schneid, Vogt; Andreas Steidele, Wolperswende-Mochenwangen, both of Fed. Rep. of Germany

[73] Assignee: Sulzer-Escher Wyss AG, Zurich, Switzerland

[21] Appl. No.: 658,816

[22] Filed: Oct. 9, 1984

[30] Foreign Application Priority Data

Oct. 17, 1983 [CH] Switzerland ............... 5630/83

[51] Int. Cl.[4] .................. B21B 37/08; B21B 31/16
[52] U.S. Cl. ............................ 72/21; 72/232; 72/243; 425/150; 425/367
[58] Field of Search .......... 72/243, 232, 245, 21; 29/113 AD, 116 AD; 425/141, 150, 367

[56] References Cited

U.S. PATENT DOCUMENTS

| 4,380,954 | 4/1983 | Edele | 72/243 |
| 4,472,958 | 12/1981 | Biondetti | 29/116 AD |
| 4,480,537 | 11/1984 | Agronin et al. | 72/243 |

Primary Examiner—Francis S. Husar
Assistant Examiner—Jorji M. Griffin
Attorney, Agent, or Firm—Werner W. Kleeman

[57] ABSTRACT

The calender comprises a predetermined number of rolls and at least one of the rolls, for example, the outer roll or the lowest roll of such predetermined number of rolls is structured as a tubular roll or controlled deflection roll comprising a stationary roll support member or beam and a roll shell which rotates about the stationary roll support member and is supported thereat. A position sensor determines the position of the roll shell which is regulated with respect to predetermined reference values by a regulating device. A pre-selected number of different reference values for the position of the roll shell are provided and by selecting an appropriate one of these reference values there is achieved the result that different numbers of the predetermined number of rolls are operative while the remaining rolls of such predetermined number of rolls bear against related stops so that their related roll nips or gaps remain open.

9 Claims, 4 Drawing Figures

CALENDER

BACKGROUND OF THE INVENTION

The present invention relates to a new and improved construction of a calender or rolling mill.

In its more particular aspects, the present invention relates to a new and improved construction of a calender or rolling mill comprising a predetermined number of rolls which are moveable in at least one pressing direction. At least one of the rolls is structured as a tubular roll or controlled deflection roll comprising a stationary roll support member or beam and a roll shell which is rotatable about the stationary roll support member and which is displaceable in radial direction over its entire length. The roll shell is supported at the roll support member or beam by means of pressure or support elements which are supplied with pressure fluid and exert a supporting force on the roll shell. At least one position sensor is provided in order to determine the position of at least one of the rolls and there are also provided regulating means for regulating the position of the rolls.

In calendars of the type as known, for example, from U.S. Pat. No. 4,357,743, granted Nov. 9, 1982 or British Patent Publication No. 2,091,150, published July 28, 1982 and the cognate U.S. Pat. No. 4,472,958, granted Sept. 25, 1984, the lowest, and if desired, also the topmost roll constitutes a tubular roll or controlled deflection roll of the type as described, for example, in U.S. Pat. No. 3,885,283, granted May 27, 1975.

The tubular roll or controlled deflection roll is constructed to include a roll shell which is displaceable relative to the roll support member or beam in vertical direction, i.e. in the pressure or pressing plane. The entire roll arrangement or roll bank, therefore, would float with respect to the pressing direction with the consequence that the position of the roll nips or gaps would be undefined even if all forces are balanced. In order to establish the desired and required position of the rolls, and thus, of the roll nips or gaps, there are therefore provided position sensors which determine the position of the roll shell at its ends relative to the roll support member or beam or relative to a roll carrying frame. The position sensors control regulating means which regulate the pressure of the pressure fluid for the pressure elements such that the roll shell and thus also the roll nips or gaps assume the intended position. When a related position sensor is arranged on both sides or at both ends of the roll shell, there can be simultaneously maintained a predetermined position of the rolls by a differential regulation.

Calenders of this type are used, for example, for manufacturing foils of metal, paper or plastic foils or sheets or in the manufacture of textile goods. In such applications, the web of the material which is to be smoothed or calendered, rolled or processed, sequentially passes through the roll nips or gaps formed between individual ones of the rolls. As described, for example, in U.S. Pat. No. 3,884,141, granted May 20, 1975, such calender and the roll nips or gaps therein are opened in such a manner that the regulating means for regulating the pressure of the pressure fluid for the pressure or support elements are readjusted or reset so that the individual rolls are lowered to bear upon related stops. These individual stops or abutments are selected such that an open gap is formed between the entire number of rolls. After the introduction of the web of material or after exchange of one of the rolls, the regulating means are re-activated and the entire roll arrangement is brought again into the intended position, whereby the roll nips or gaps are again closed.

In such known calenders and roll arrangements, it is merely intended that the regulating means regulate the roll position with respect to a predetermined positional value and during the regulating operation there is always effective the entire roll arrangement and its total weight. In practice, however, there is a desire for greater flexibility in the use of the calender, that is, one and the same calender should be able to operate upon different types of materials and should be able to perform different processing operations without complicated reconstructions. It would be necessary therefor to selectively use either all of the rolls in the calender or only part of the rolls contained therein. Consequently, the number of effective or operative rolls should be selectable as a function of the material to be processed. Furthermore, it would be desirable to provide a compensation for changes in the diameter of the rolls, for example, due to abrasive or grinding wear during the service life of the rolls. The known calenders or roll arrangements of the initially mentioned type possessing the advantage of using controlled deflection rolls, however, could not heretofore satisfy such requirements or only when associated with a great additional expense.

SUMMARY OF THE INVENTION

Therefore, with the foregoing in mind, it is a primary object of the present invention to provide a new and improved calender which is not afflicted with the drawbacks and limitations of the prior art constructions heretofore discussed.

Another and more specific object of the present invention aims at the provision of a new and improved construction of a calender which has a much greater flexibility in its use without requiring significant additional expense.

Still a further significant object of the present invention is directed to a new and improved construction of a calender which can be rapidly and simply converted in an uncomplicated manner in order to operate upon different materials.

Another, still important object of the present invention is directed to a new and improved construction of a calender which can be rapidly and simply converted in an uncomplicated manner, specifically with respect to the number of operative rolls thereof, so as to process different materials.

Now in order to implement these and still further objects of the invention, which will become more readily apparent as the description proceeds, the calender of the present development is manifested by the features that, the regulating means are structured such as to regulate the position of the rolls with respect to a pre-selected number of different positional values.

When such type of regulating means are used, the regulation can be performed in different steps such that, depending on the adjusted positional value, only a pre-determined, pre-selectable number of lower rolls is displaceable in vertical direction and, thus, exerts pressure in accordance with the weight of the rolls in the roll nips or gaps while the remaining upper rolls bear upon their related stops or abutments and do not contribute to the pressing operation.

It may be preferred to select the number of steps or positional values so as to be equal to the number of roll nips or gaps so that for each adjustment, a different number of rolls is effective. However, advantageously there can also be provided a greater number of feasible positional values in order to achieve an improved fine adjustment and a compensation for variations in the diameter of the rolls. This greater number of feasible positional values may be increased towards a digital-value controlled numerical type of regulation having very fine steps or increments or to a continuous range of positional values or to yield an analog-type regulation.

BRIEF DESCRIPTION OF THE PREFERRED EMBODIMENTS

The invention will be better understood and objects other than those set forth above, will become apparent when consideration is given to the following detailed description thereof. Such description makes reference to the annexed drawings wherein throughout the various figures of the drawings there have been generally used the same reference wherein.

DETAILED DESCRIPTION OF THE PREFERRED EMBODIMENTS

Figure 1:
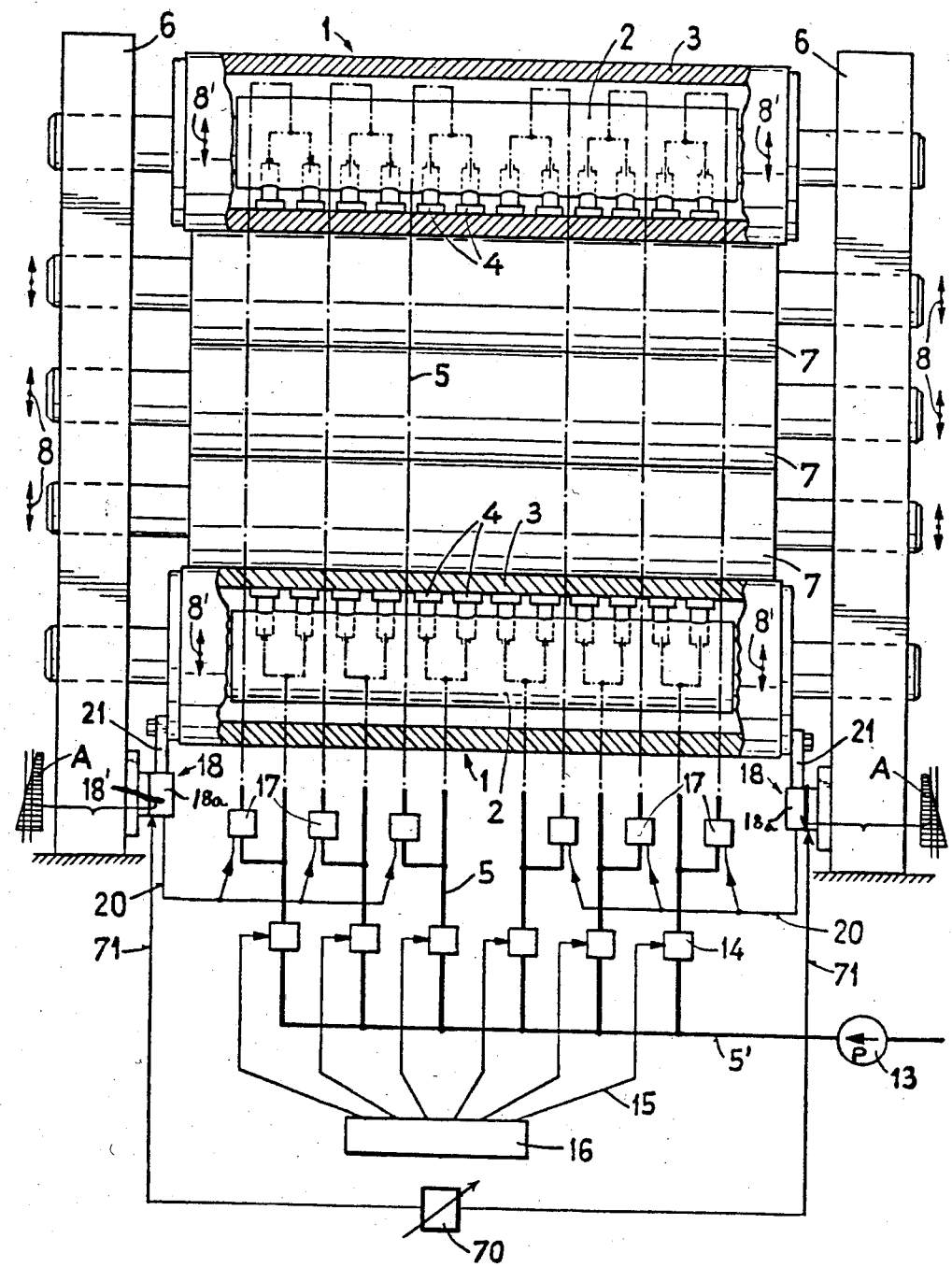
FIG. 1 is a schematic illustration of a calender or rolling mill constructed according to the invention and including controlled deflection rolls and regulating means.

Describing now the drawings, it is to be understood that only enough of the construction of the calender has been shown as needed for those skilled in the art to readily understand the underlying principles and concepts of the present development, while simplifying the showing of the drawings. Turning attention now specifically to FIG. 1, there has been schematically illustrated a roll arrangement or calender comprising a predetermined number or set of rolls of which at least one, namely the two terminal rolls of the set, constitute tubular rolls or controlled deflection rolls 1 constructed as described in the initially mentioned U.S. Pat. No. 3,885,283 granted May 27, 1975. The tubular rolls or controlled deflection rolls 1 each contain a stationary roll support member or beam 2 and a tube-shaped or tubular roll shell 3 which is rotatable about the roll support member or beam 2. Within each of the roll support members or beams 2 there are provided cylindrical-type bores receiving pressure generating elements, such as piston-shaped pressure or support elements 4 which exert a supporting force and support the roll shell 3 at the roll support member or beam 2 as is well known for such controlled deflection rolls. Each two of the pressure or support elements 4 form a group connected to a hydraulic pressure line 5. It will be understood, however, that in practice each group may contain a different number of such pressure or support elements 4.

With regard to the function of the pressure or support elements 4, reference is expressly made to U.S. Pat. No. 3,802,004, granted Apr. 9, 1974, the disclosure of which is incorporated herein by reference.

The ends of the roll support members or beams 2 are supported at side members 6 of a schematically indicated roll carrying frame or roll stand. Intermediate rolls 7 are present between the tubular rolls or controlled deflection rolls 1 and these intermediate rolls 7 are displaceable at the roll carrying frame or roll stand in appropriate standard guide means as generally indicated by the arrows 8.

As also indicated by arrows 8', the roll shells 3 are also displaceable in a pressing direction or in the pressure or pressing plane in which extend the lengthwise axes of the roll shells 3 and of the intermediate rolls 7.

Figure 2:
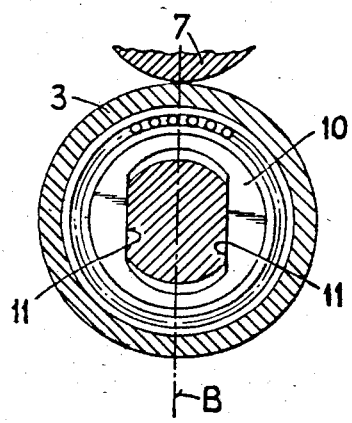
FIG. 2 is a section through one of the controlled deflection rolls in the calender shown in FIG. 1.
Figure 3:
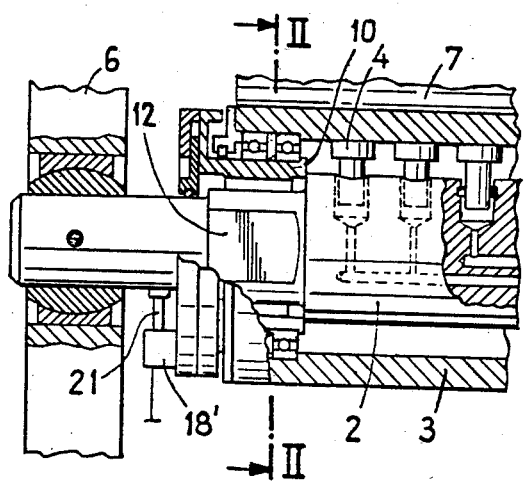
FIG. 3 is a section through one end of a roll including a position sensor in the calender shown in FIG. 1.

As will be evident from FIGS. 2 and 3, such displaceability is a result of the roll shells 3 being rotatably journaled at both their ends in related bushes 10 or the like which are provided with internal parallel guide means 11. The roll support members or beams 2 are provided with parallel surfaces 12 at the location of the bushes 10 and these parallel surfaces 12 cooperate with the parallel guide means 11 as is well known in this technology.

As will be further evident from FIG. 1, the pressure lines 5 which lead to the groups of pressure or support elements 4 are supplied with, for instance, hydraulic pressure fluid by a pump or pump means 13. Pressure or pressing force regulators 14 are interconnected into the branches of the pressure lines 5 which branch off from a common distributing line or conduit 5'. The pressure or pressing force regulators 14 receive related reference or set value signals via related control lines 15 from a control or control device 16 which regulates the pressing force exerted by related upper and lower groups of pressure or support elements 4.

In this arrangement, the hydraulic pressure which is adjusted by the pressing force regulators 14 directly acts upon the related pressure or support elements 4 of the lower roll 1 while related differential pressure regulators 17 are arranged in each line 5 which leads to the related upper pressure or support elements 4. The arrangement may also be reversed with respect to the arrangement of the differential pressure regulators 17. The differential pressure regulators 17 of the pairs of cooperating upper and lower groups of pressure or support elements 4 which are connected to a related common pressure line 5, are under the influence of signals originating from position regulating means 18 each here containing a related conventional position sensor or detector 18a for determining the position of the rotatable roll shell 3 of the lower tubular roll or controlled deflection roll 1. The signals are indicative of the position of the roll shell 3 and are supplied as a regulating magnitude to the differential pressure regulators 17 of the regulating means or system via related signalling lines 20 and such signals are affected by the position of the roll shell 3 as well as by reference value signals generated by control means 70 which constitute a reference value generator.

The variation of the signal at the position regulating means 18 is schematically indicated by the diagrams designated with the reference character A in FIG. 1. A housing 18' of such position sensor 18a is mounted to the side member 6 of the roll carrying frame or roll stand and with increasing elevation of the roll shell 3 of the lower tubular roll or controlled deflection roll 1 relative to the housing 18' of the position sensor 18a the magnitude of the reference or set value signal is decreased as shown in the diagram A. This, in turn, has the result that a smaller pressure difference is caused by the differential pressure regulators 17 between the pressure or support elements 4 of the lower tubular roll or controlled deflection roll 1 and the pressure or support elements 4 of the upper tubular roll or controlled deflection roll 1. The displacements of the roll shell 3 with respect to the housing 18' are determined by means of a member 21 at each end of the roll shell 3. Each such member 21, as illustrated in FIGS. 1 and 3, is connected to the bush 10 and thus is displaceable conjointly with the roll shell 3.

The pressure difference existing between the lower and upper pressure or support elements 4 is thus varied by the position regulating means 18 and by the differential pressure regulators 17 until the position of the roll shell 3 assumes the predetermined value, i.e. until the rolls and roll nips or gaps assume the predetermined position with respect to at least one predetermined set value.

It is further of advantage in the regulating means or system as described hereinbefore that the right-hand position regulating means 18 more strongly and in a decreasing fashion from the right to the left acts upon the right-hand groups of pressure or support elements 4, while the left-hand position regulating means 18 act correspondingly more strongly upon the left-hand pressure or support element groups. In addition to the general position of the roll shell 3 there is thus also regulated the direction of the roll shell 3 in such a manner that the roll shell 3 always remains in its predetermined position. There is furthermore present the additional advantage which automatically results from the use of controlled deflection rolls, that practically no bending of the roll shells 3 and of the intermediate rolls 7 occurs.

The regulating means or system further contain the control means 70 by means of which a preselected reference value which corresponds to a preselected positional value of the roll shell 3, can be supplied to the position regulating means 18. The position regulating means 18 then supply signals to the differential pressure regulators 17 which correspond to the difference in the position of the roll shell 3 which is determined by the position sensors operatively associated with the position regulating means 18 and which signals depend on the predetermined reference value adjusted at the control means 70. In this manner the roll shell 3 is adjusted in a position in correspondence to the related reference value.

The control means 70, however, can also be constructed in such a manner that the position regulating means 18 which, in the illustrated embodiment, are shown as constructional units conjointly with the related position sensor 18a, are separated from the position sensors and are arranged at an appropriate other location, for example, as a constructional unit with the differential pressure regulators 17.

It can be preferable to construct the control means 70 such that a pre-selected number of discrete and different reference values are supplied thereby. The pre-selected number of reference values differ from each other and correspond to a preselected number of positional values of the roll shell 3. These positional values differ from each other and may correspond to the number of roll nips or gaps which are present in the roll arrangement or calender. In particular, the reference values should be selected in relation to the stops or abutments which are provided for the individual rolls as will be explained hereinafter with reference to FIG. 4.

Figure 4:
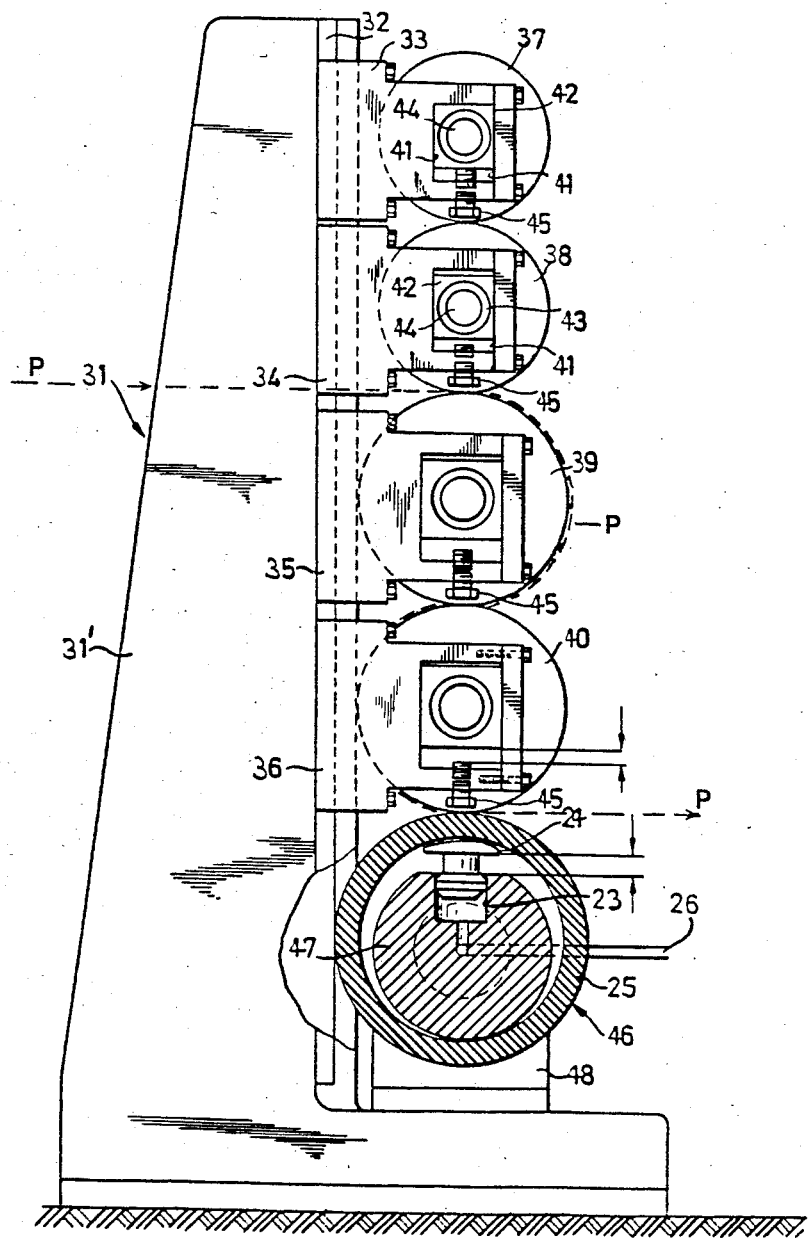
FIG. 4 is a side view of a further embodiment of the calender according to the invention.

The further embodiment of the roll arrangement or calender schematically illustrated in FIG. 4 contains a roll stand 31 which comprises two vertical side members 31'. Each side member 31' is provided with guide means 32 at which related bearing brackets 33, 34, 35 and 36 of related rolls 37, 38, 39 and 40 are mounted. The bearing brackets 33, 34, 35 and 36 are displaceable lengthwise of the guide means 32 and are provided with guide members 41 at which bearing blocks 42 of the individual rolls 37, 38, 39 and 40 are guided. These bearing blocks 42 contain bearing bushes 43 in which journals 44 of the individual rollers 37, 38, 39 and 40 are rotatably journaled. The downward displacement of the bearing blocks 42 is limited by stops or abutments which, in the illustrated embodiment, comprise a predetermined number of stop bolts 45 or the like. These stop bolts 45 are adjusted in such a manner that when the calender is opened and all of the rolls 37, 38, 39 and 40 bear upon the related stop bolts 45, an opening is formed between all of the rolls 37, 38, 39 and 40.

The lowermost roll 46 constitutes a tubular roll or a controlled deflection roll. This roll 46 comprises a stationary roll support member or beam 47 carried by supports 48 mounted at the roll stand 31. A roll shell 25 is rotatable about this roll support member or beam 47 and is mounted at hydrostatic pressure or supporting elements 24 comprising piston-like members guided in substantially cylindrical bores 23. A suitable hydraulic pressure fluid is supplied to the cylindrical bores 23 via conduits or lines 26.

When the pressure fluid supply is cut off, the pressure or support elements 24 are lowered into their lowest positions and all of the rolls 37, 38, 39 and 40 drop to their related stop bolts 45. As mentioned hereinbefore, openings or gaps are thus formed between all of the rolls 37, 38, 39 and 40. Now when the pressure fluid supply is again turned on by the associated regulating means, the pressure or support elements 24 are upwardly urged and elevate the roll shell 25 to such an extent that the roll shell 25 lifts the next-lower roll 40 from the related stop bolt 45, so that the lowest roll nip or gap is closed while the upper rolls 37, 38 and 39 still bear upon their related stop bolts 45 and the related upper openings or gaps remain unclosed. During further increase of the pressure of the pressure or pressurized fluid, there is firstly also raised the third roll 39 from below and the opening or gap between the rolls 39 and 40 is also closed so that there are now two roll nips or gaps available for the processing of a desired material. During still further increase of the pressure of the pressurized fluid or fluid medium by the regulating means, the next-following roll 38 is lifted and finally the topmost roll 37, so that then all of the roll nips or gaps are effective.

By using the regulating means in the manner described hereinbefore there can be thus activated and made effective any selected number of rolls by a simple regulation of the position of the lowermost roll 46 or the roll shell 25 thereof while the remaining upper rolls inoperatively bear upon their related stop bolts 45. In the embodiment illustrated in FIG. 4, there is shown an example in which the four lowermost rolls 38, 39, 40 and 46 or the three lowermost roll nips or gaps act upon a web P of a material. It is also possible and, furthermore, is sufficient, to select the reference values for the position regulation in such a manner or at such a difference from each other that during each increase of the reference value by one step or increment one further roll is elevated and made operative and a further roll nip or gap is activated. The number of reference values for the roll shell position can thus be restricted to the number of usable roll nips or gaps. However, it may be advantageous under certain circumstances to provide a more finely or even continuously adjustable regulation having a greater number of adjustable reference values, for example, if a compensation is required for positional changes which are due to changes in the diameter of the rolls. A fine-adjustment regulation can be achieved, for example, by a numerical regulation which is controllable by the infeed of digital values and wherein, for example, a microprocessor is used. Other regulating operations are feasible within the scope of the inventive concepts, for example, a mechanical, optical, hydraulic or pneumatic adjustment of the reference values instead of an electrical adjustment of the threashold value of the position sensor or any other kind of regulation circuits.

Also in other respects or aspects the invention is not restricted to the exemplary embodiments described in detail hereinbefore and modifications are feasible within the scope of the inventive concepts. Thus, for example, the rolls do not have to be arranged vertically above each other as shown in the preferred embodiment, but may also be positioned at an inclination or horizontally in order to eliminate or reduce the effect of the inherent weight of the rolls. The position sensors can be provided at any desired roll which need not be the lowermost roll or can even be provided at a number of rolls. Also, the tubular rolls or controlled deflection rolls may be of different construction and may be provided with different kinds of pressure or support elements as compared to the illustrated controlled deflection rolls containing hydrostatic pressure or support elements. For example, the tubular rolls may comprise hydrodynamic support elements or support elements in the form of pressure chambers.

It is further noted that the position sensors can be of any appropriate type, like, for example, mechanical, optical, electrical or hydraulic sensors. There can also be provided any desired number of position sensors. Instead of two position sensors at the ends of the roll there can also be provided only a single sensor which, for example, may be an optical sensor and which monitors the entire width of the roll in a contactless manner. The regulation of the roll position can also be performed in many different manners, like, for example, electrically, hydraulically, mechanically or optically.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A calender comprising:
   a predetermined number of rolls which are displaceable at least in one pressing direction;
   at least one of said predetermined number of rolls constituting a tubular roll comprising a stationary roll support member and a roll shell rotatable about said stationary roll support member and substantially radially displaceable over its entire length;
   pressure generating elements supplied with pressure fluid and exerting a supporting force on said roll shell in order to support said roll shell at said stationary roll support member of said tubular roll; at least one position sensor for determining the position of at least one roll of said predetermined number of rolls;
   regulating means operatively connected to said at least one position sensor for regulating said position of said at least one roll with respect to at least one predetermined set value; and
   said regulating means further regulating the position of said at least one roll of said predetermined number of rolls with respect to a pre-selected number of positional values which differ from each other; and
   said regulating means containing control means generating a preselected number of reference values which differ from each other and correspond to said preselected number of positional values.

2. The calender as defined in claim 1, wherein:
   said at least one roll, the position of which is regulated, constitutes said at least one tubular roll having said stationary roll support member and said rotatable roll shell; and
   said at least one position sensor being constructed and arranged such as to determine the position of said rotatable roll shell and to deliver a signal indicative of said position of said rotatable roll shell as a regulating magnitude to said regulating means.

3. The calender as defined in claim 1, wherein:
   said predetermined number of rolls define a set of rolls incorporating two terminal rolls; and
   at least one of said two terminal rolls constituting said at least one tubular roll comprising said stationary roll support member and said roll shell rotatable thereabout.

4. The calender as defined in claim 3, wherein:
   said at least one tubular roll constitutes two tubular rolls each one of which constitutes a related one of said two terminal rolls;
   said at least one position sensor being operatively associated with one of said two tubular rolls;
   said regulating means comprising at least one differential pressure regulator for regulating the position of the roll shell of said one tubular roll with which said at least one position sensor is operatively associated as a function of regulating magnitudes supplies by said at least one position sensor;
   a set value generator operatively connected to said regulating means; and
   said at least one differential pressure regulator regulating said position of said roll shell of said tubular roll as a function of said at least one predetermined set value generated by said set value generator.

5. The calender as defined in claim 4, wherein:
   said control means comprises a reference value generator supplying said pre-selected number of reference values which differ from each other.

6. The calender as defined in claim 5, wherein:
   said predetermined number of rolls defines a predetermined number of roll nips therebetween; and
   said pre-selected number of reference values corresponding to said predetermined number of roll nips.

7. The calender as defined in claim 6, further including:
   a predetermined number of stops;
   each said stop being operatively associated with a related roll of said predetermined number of rolls; and
   said pre-selected number of reference values being selected in such a manner that, during the regulation of said position of said roll shell of said tubular roll with respect to individual ones of said pre-selected number of reference values, a pre-selected number of said rolls bears upon the stops associated therewith.

8. The calender as defined in claim 1, wherein: said regulating means constitute numerical regulating means controllable by digital data.

9. The calender as defined in claim 1, wherein: said regulating means is constructed as a stop regulator.

* * * * *

UNITED STATES PATENT AND TRADEMARK OFFICE
CERTIFICATE OF CORRECTION

PATENT NO. : 4,597,275
DATED : July 1, 1986
INVENTOR(S) : JOSEF SCHNEID et al

It is certified that error appears in the above—identified patent and that said Letters Patent is hereby corrected as shown below:

Column 3, line 22, after "reference" please insert
--characters to denote the same or analogous components and--

Column 6, line 45, please delete "of the pressure" (second occurrence)

Signed and Sealed this

Fourth Day of November, 1986

[SEAL]

Attest:

DONALD J. QUIGG

Attesting Officer

Commissioner of Patents and Trademarks